United States Patent
Pleasant et al.

(10) Patent No.: US 8,930,579 B2
(45) Date of Patent: Jan. 6, 2015

(54) SYSTEM AND METHOD FOR SYNCHRONIZING OPERATIONS OF A PLURALITY OF DEVICES VIA MESSAGES OVER A COMMUNICATION NETWORK

(75) Inventors: Daniel L. Pleasant, Santa Rosa, CA (US); Gopalakrishnan Kailasam, Santa Rosa, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 1946 days.

(21) Appl. No.: 10/939,838

(22) Filed: Sep. 13, 2004

(65) Prior Publication Data

US 2006/0059270 A1    Mar. 16, 2006

(51) Int. Cl.
G06F 15/16 (2006.01)
G06F 15/173 (2006.01)
H04L 12/24 (2006.01)
H04J 3/06 (2006.01)

(52) U.S. Cl.
CPC ............... H04L 41/06 (2013.01); H04J 3/0664 (2013.01); H04J 3/0667 (2013.01); H04L 41/22 (2013.01)
USPC ............ 709/249; 709/218; 709/220; 709/224

(58) Field of Classification Search
CPC ......... G06F 1/12; G06F 9/4837; G06F 9/546; G06F 11/3089; H04L 12/2408; H04L 12/2602; H04L 12/58; H04L 29/08558; H04L 29/08567; H04L 43/106; H04L 43/12
USPC ......... 709/203, 218, 220–224, 248, 249, 253; 713/1, 2, 100, 400, 401, 502, 600; 702/178
See application file for complete search history.

(56) References Cited

U.S. PATENT DOCUMENTS 5,214,236 A   5/1993   Murphy et al.
5,293,374 A   3/1994   Eidson
5,566,180 A   10/1996  Eidson
(Continued)

FOREIGN PATENT DOCUMENTS

EP   0 903 655 A3   3/2000
EP   1 115 001 A1   7/2001
(Continued)

OTHER PUBLICATIONS

Mogul, J. et al. "Pulse-Per-Second API for UNIX-Like Operating Systems, Version 1.0," RFC 2783, Mar. 2000, pp. 1-31.*

(Continued)

Primary Examiner — Melvin H Pollack

(57) ABSTRACT

A system and method synchronize operations of a plurality of devices via messages over a communication network. A plurality of devices are communicatively coupled via a communication network, and the devices have their local clocks synchronized to a high degree of precision a technique, such as IEEE 1588, for synchronizing their local clocks. Event messages can be sent that include an identification of an event, as well as a timestamp that is based on the local clock of the sender. The recipient of an event message determines if it is configured to act on the identified event, and if so it takes its action based on the timestamp included in the event message. In certain embodiments, the events that are to trigger an action and/or the specific responsive actions to be taken for a given event are dynamically programmable for each device.

41 Claims, 3 Drawing Sheets

(56) References Cited

U.S. PATENT DOCUMENTS

| | | | |
|---|---|---|---|
| 5,744,377 A | 4/1998 | Sekiguchi | |
| 5,878,372 A * | 3/1999 | Tabarovsky et al. | 702/7 |
| 5,887,029 A | 3/1999 | Husted | |
| 5,887,143 A | 3/1999 | Saito | |
| 5,987,022 A | 11/1999 | Geiger et al. | |
| 6,006,254 A | 12/1999 | Waters et al. | |
| 6,108,782 A * | 8/2000 | Fletcher et al. | 713/153 |
| 6,161,123 A | 12/2000 | Renouard et al. | |
| 6,236,277 B1 | 5/2001 | Esker | |
| 6,278,710 B1 | 8/2001 | Eidson | |
| 6,327,274 B1 | 12/2001 | Ravikanth | |
| 6,498,968 B1 | 12/2002 | Bush | |
| 6,512,990 B1 | 1/2003 | Woods | |
| 6,581,110 B1 * | 6/2003 | Harif et al. | 709/248 |
| 6,611,922 B2 * | 8/2003 | Ozcetin et al. | 713/400 |
| 6,662,217 B1 | 12/2003 | Godfrey | |
| 6,741,952 B2 | 5/2004 | Eidson | |
| 6,745,232 B1 | 6/2004 | Blech | |
| 6,771,594 B1 | 8/2004 | Upadrasta | |
| 6,804,793 B2 * | 10/2004 | Josephson et al. | 713/501 |
| 6,826,590 B1 | 11/2004 | Glanzer | |
| 6,865,686 B1 | 3/2005 | Krause et al. | |
| 6,894,953 B2 * | 5/2005 | Otto | 368/113 |
| 6,903,681 B2 * | 6/2005 | Faris et al. | 342/357.4 |
| 6,915,353 B2 * | 7/2005 | Burkes et al. | 709/248 |
| 6,952,727 B1 | 10/2005 | Lindner | |
| 6,983,391 B2 * | 1/2006 | Woods et al. | 713/400 |
| 6,983,393 B2 * | 1/2006 | Truchard et al. | 713/500 |
| 6,985,499 B2 | 1/2006 | Elliot | |
| 7,012,980 B2 * | 3/2006 | Franke et al. | 375/356 |
| 7,028,204 B2 | 4/2006 | Jammes | |
| 7,035,246 B2 * | 4/2006 | Taylor | 370/350 |
| 7,036,013 B2 * | 4/2006 | Renganarayanan et al. | 713/178 |
| 7,054,399 B1 | 5/2006 | Hildebran | |
| 7,058,838 B2 | 6/2006 | Xu | |
| 7,069,325 B1 * | 6/2006 | Lu et al. | 709/226 |
| 7,079,977 B2 * | 7/2006 | Osorio et al. | 702/176 |
| 7,080,160 B2 * | 7/2006 | Cognet et al. | 709/248 |
| 7,111,195 B2 * | 9/2006 | Berkcan et al. | 714/12 |
| 7,114,091 B2 * | 9/2006 | Vrancic | 713/400 |
| 7,120,121 B2 * | 10/2006 | Sikdar | 370/241 |
| 7,162,510 B2 | 1/2007 | Jammes | |
| 7,203,858 B2 * | 4/2007 | Loukianov et al. | 713/400 |
| 7,219,173 B2 * | 5/2007 | Sha et al. | 710/61 |
| 7,224,984 B2 * | 5/2007 | Agrawala et al. | 455/456.1 |
| 7,280,565 B2 | 10/2007 | Franke et al. | |
| 7,322,048 B2 * | 1/2008 | Nortung | 726/34 |
| 7,324,510 B2 | 1/2008 | Howe | |
| 7,339,886 B2 * | 3/2008 | Kim | 370/216 |
| 7,340,630 B2 * | 3/2008 | Morris et al. | 713/400 |
| 7,366,205 B2 * | 4/2008 | Arnold et al. | 370/503 |
| 7,376,156 B2 * | 5/2008 | Repko et al. | 370/503 |
| 7,379,480 B2 * | 5/2008 | Balasubramanian et al. | 370/516 |
| 7,457,868 B1 * | 11/2008 | Guo | 709/224 |
| 7,478,151 B1 * | 1/2009 | Maiocco et al. | 709/223 |
| 7,486,681 B2 * | 2/2009 | Weber | 370/395.4 |
| 7,542,485 B2 * | 6/2009 | Bingham et al. | 370/507 |
| 7,643,595 B2 * | 1/2010 | Aweya et al. | 375/356 |
| 7,693,248 B2 * | 4/2010 | Miller et al. | 375/376 |
| 7,804,852 B1 * | 9/2010 | Durham et al. | 370/469 |
| 7,831,323 B2 * | 11/2010 | Weber et al. | 700/96 |
| 2002/0022945 A1 | 2/2002 | Takayasu et al. | |
| 2002/0027913 A1 | 3/2002 | Tajiri et al. | |
| 2002/0077005 A1 | 6/2002 | Tajiri et al. | |
| 2002/0116154 A1 | 8/2002 | Nowak et al. | |
| 2002/0169844 A1 | 11/2002 | Jammes et al. | |
| 2002/0169993 A1 | 11/2002 | Woods et al. | |
| 2003/0079022 A1 | 4/2003 | Toporek et al. | |
| 2003/0098992 A1 | 5/2003 | Park et al. | |
| 2003/0152034 A1 | 8/2003 | Zhang et al. | |
| 2003/0177154 A1 | 9/2003 | Vrancic | |
| 2004/0028123 A1 | 2/2004 | Sugar et al. | |
| 2004/0062204 A1 | 4/2004 | Bearden et al. | |
| 2005/0041765 A1 | 2/2005 | Dalakuras et al. | |
| 2005/0047337 A1 | 3/2005 | Virtanen | |
| 2005/0144309 A1 * | 6/2005 | Gish | 709/233 |
| 2005/0183098 A1 | 8/2005 | Ilic et al. | |
| 2005/0207387 A1 | 9/2005 | Middleton et al. | |
| 2005/0232151 A1 | 10/2005 | Chapweske et al. | |
| 2006/0036992 A1 | 2/2006 | Hayles et al. | |
| 2006/0129693 A1 | 6/2006 | LeCroy et al. | |

FOREIGN PATENT DOCUMENTS

| | | |
|---|---|---|
| EP | 1 256 858 A2 | 11/2002 |
| GB | 2385499 | 8/2003 |
| GB | 2 386 982 A | 10/2003 |
| GB | 2387752 | 10/2003 |

OTHER PUBLICATIONS

Mills, D. "Simple Network Time Protocol (SNTP) Version 4 for IPv4, IPv6 and OSI," RFC 2030, Oct. 1996, pp. 1-18.*

Gowin, D. "NTP PICS PROFORMA for the Network Time Protocol Version 3," RFC 1708, Oct. 1994, pp. 1-13.*

Mills, David L. "Network Time Protocol (Version 3) Specification, Implementation and Analysis," RFC 1305, Mar. 1992, pp. 1-96.*

Crowcroft, J. and Onions, J. "Network Time Protocol (NTP) over the OSI Remote Operations Service," RFC 1165, Jun. 1990, pp. 1-10.*

Postel, J. "User Datagram Protocol," RFC 768, Aug. 1980, pp. 1-3.*

Larzon, L-A. et al. "The Lightweight User Datagram Protocol (UDP-Lite)," RFC 3828, Jul. 2004, pp. 1-12.*

Klyne, G. and Newman, C. "Date and Time on the Internet: Timestamps," RFC 3339, Jul. 2002, pp. 1-18.*

Holler, R. et al. "Embedded SynUTC and IEEE 1588 Clock Synchronization for Industrial Ethernet," Proceeding of the IEEE Conference on Emerging Technologies and Factory Automation (ETFA), vol. 1, Sep. 19, 2003, pp. 422-426.*

Edison, J. C. and Lee, Kang. "Sharing a Common Sense of Time," IEEE Instrumentation & Measurement Magazine, vol. 6, Issue 1, Mar. 2003, pp. 26-32.*

Guang, Cheng et al. "A Relative Time Model in a Distributed Network using Exchanged Time Information," First IEEE Consumer Communications and Networking Conference (CCNC), Jan. 8, 2004, pp. 382-387.*

Mohl, Dirk. "IEEE 1588: Running Real-Time on Ethernet," The Industrial Ethernet Book: Enhancing Automation and Internet Connectivity, Issue 17, Nov. 2003, pp. 35-38.*

"Synchronizing, Measurment and Control Systems," Sensors Online, Edison J. C. et al., Nov. 2002, pp. 1-6.

Search Report Dated: Nov. 25, 2005.

U.S. Published Application 2002/0038441, Mar. 28, 2002, Eguchi et al.

U.S. Published Application 2003/0023739, Jan. 30, 2003, Ngoc Vu.

U.S. Published Application 2003/0115501, Jun. 19, 2003, Bamford.

U.S. Published Application 2004/0039825, Feb. 26, 2004, Bennett.

U.S. Appl. No. 10/939,922, Sep. 13, 2004, Daniel L. Pleasant et al.

U.S. Appl. No. 10/939,867, Sep. 13, 2004, John B. Stratton et al.

U.S. Appl. No. 10/939,921, Sep. 13, 2004, Daniel L. Pleasant et al.

Fischer, M. et al., "Node Synchronization Improvements by High Stability Oscillators", [online] 28 pages, [Retrieved Aug. 27, 2004] Retrieved from: http://ieee1588.nist.gov/Agilent_copyright1.htm.

Harris, K. et al., "The Future of Time Synchronization", ABJournal. com, Jun. 2004, pp. 19-21.

Eidson, J. et al., "Synchronizing Measurement and Control Systems", [online] [Retrieved Aug. 27, 2004] Retrieved from: http://www.sensorsmag.com/articles/1102/26/main.shtml, 7 pages.

Eidson, J., "IEEE-1588 Standard for a Precision Clock Synchronization Protocol for Networked Measurement and Control Systems", Agilent Technologies, presented at I&M Society IEEE 1588, Jul. 16, 2003, 46 pages.

"SynUTC—An Ultra High Precision IEEE 1588 Compliant Time Synchronization Technology", Oregano Systems, SynUTC Overview, Oct. 2003.

Search Report dated Nov. 30, 2005.

International Standard, Precision clock synchronization protocol for networked measurement and control system, first edition Sep. 9, 2004, pp. 1-153.

Search Report dated Dec. 2, 2005.

"Ethernet Hits Real-Time . . . Really", Manufacturing Net, Jim Montague, Dec. 1, 2003, pp. 1-3.

* cited by examiner

SYSTEM AND METHOD FOR SYNCHRONIZING OPERATIONS OF A PLURALITY OF DEVICES VIA MESSAGES OVER A COMMUNICATION NETWORK

CROSS-REFERENCE TO RELATED APPLICATIONS

This application is related to concurrently filed and commonly assigned U.S. patent application Ser. No. 10/939,922 entitled SYSTEM AND METHOD FOR COORDINATING THE ACTIONS OF A PLURALITY OF DEVICES VIA SCHEDULING THE ACTIONS BASED ON SYNCHRONIZED LOCAL CLOCKS, Ser. No. 10/939,921 entitled "SYSTEM AND METHOD FOR ROBUST COMMUNICATION VIA A NON-RELIABLE PROTOCOL", and Ser. No. 10/939,867 entitled "ADD-ON MODULE FOR SYNCHRONIZING OPERATIONS OF A PLURALITY OF DEVICES", the disclosures of which are hereby incorporated herein by reference.

BACKGROUND OF THE INVENTION

Synchronization of the operation of various components of a system is often desired. For instance, in measurement systems that are made up of several traditional all-in-one box instruments, complex measurements often require that several instruments be controlled together in order to properly synchronize their respective operations. As examples, spectrum analyzers should not be allowed to take measurements until signal sources have settled; power meter measurements should not be taken until a sufficient number of samples have been averaged to ensure accuracy; and frequency-sweeping sources should not be allowed to switch to a new frequency until measurements have been completed at the current frequency. Thus, it becomes desirable to synchronize the relative operations of the various instruments.

Often, hardware trigger lines are used to synchronize the various instruments in a test system. Hardware trigger lines are particularly effective in measurement systems where precise synchronization is required, or where measurement speed is important. When implementing hardware trigger lines, the instruments have a trigger output and a trigger input with a dedicated hardware line (e.g., wire) connecting one instrument's trigger output to another instrument's trigger input.

For instance, a spectrum analyzer typically includes a receiver and a digitizer in the same box, wherein the output signal from the receiver should be measured after it has had some period of time in which to settle. When implementing hardware trigger lines between the receiver and the digitizer, the receiver would have a trigger output port that is coupled via a hardware line (e.g., wire) to the digitizer's trigger input port. The voltage on this hardware line goes high at the time that the output signal from the receiver has settled, and the digitizer unit's trigger input senses that voltage transition to high and thus triggers its measurement to begin. Thus, the hardware trigger line ensures that the relative operations of the instruments are synchronized in a desired manner.

The hardware trigger line technique requires a physical wire that goes between these two instruments, and the function of that wire is fixed and dedicated for use as a trigger. Further, inclusion of such hardware trigger lines increases the amount of wiring and thus often results in wiring complexities and/or complications, such as issues concerning routing of the wires and increased difficulty troubleshooting problems. Also, as the length of the hardware trigger line increases (e.g., as the coupled instruments are arranged more distant from each other), the latency of signals communicated over such hardware trigger line also increases.

Another synchronization technique uses software to control the operations of the various instruments in a synchronized manner. Such software synchronization may be used in situations in which hardware triggers are not available, such as when the instruments to be synchronized are arranged too far apart to permit the use of a hardware trigger line. In implementing software for controlling synchronization of the operation of various instruments, the software may utilize predefined time delays, queries of the instruments, and/or software interrupts for coordinating the actions of the instruments. For instance, after instructing a first instruments to take a first action, the software in an external controller may wait for a specific amount of time before instructing another instruments to take a given action that is to be performed after completion of the first action. In some cases, the software in the external controller may query an instrument to determine when it has completed a given function so that the software can determine when it is appropriate to trigger the next action. In certain instances, the instruments may be implemented to send a signal to the external controller to generate a software interrupt in the controller indicating, for example, that a given instrument has completed a certain operation.

As an example of utilizing a software synchronization technique in synchronizing the operations of the above-mentioned receiver and digitizer, a controlling computer may send a message to the receiver instructing it to change frequency. It is known that some amount of wait time is needed before triggering measurement of the signal having the changed frequency (to allow the change in the frequency to settle). So, after instructing the receiver to change its frequency, the controlling computer waits (or "sleeps") for some predefined amount of time, such as 100 milliseconds. The controlling computer then instructs the digitizer to start making a measurement.

Techniques are also known for synchronizing the clocks of networked devices to a high-degree of precision. As one example, Network Time Protocol (NTP) is a protocol that is used to synchronize computer clock times in a network of computers. In common with similar protocols, NTP uses Coordinated Universal Time (UTC) to synchronize computer clock times to within a millisecond, and sometimes to within a fraction of a millisecond. As another example, the Institute of Electrical and Electronics Engineers Standards Association (IEEE-SA) has approved a new standard for maintaining the synchrony between clocks on a network, referred to as the IEEE 1588 "Standard for a Precision Synchronization Protocol for Networked Measurement and Control Systems." In general, this IEEE 1588 standard defines messages that can be used to exchange timing information between the networked devices for maintaining their clocks synchronized. The IEEE 1588 standard enables even a greater degree of precision (e.g., to within a microsecond) in clock synchronization than that provided by NTP.

However, while techniques such as NTP and the IEEE 1588 standard provide techniques for synchronizing the clocks of networked devices to a high-degree of precision such that the networked devices that each have a local clock have a common sense of time, these techniques do not address synchronization of the operation of devices. Rather, such techniques focus on actively maintaining synchronized clocks between networked devices. Thus, the active clock synchronization techniques leave open how the devices may leverage their synchronized clocks, if at all, in order to synchronize their respective operations.

BRIEF SUMMARY OF THE INVENTION

The present invention is directed to a system and method which synchronize operations of a plurality of devices via messages over a communication network. Thus, a plurality of devices are communicatively coupled via a communication network, and the devices have their local clocks synchronized to a high degree of precision, using IEEE 1588, NTP, or some other technique for synchronizing their local clocks. Event messages can be sent that include an identification of an event, as well as a timestamp that is based on the local clock of the sender. The recipient of an event message can determine if it is configured/programmed to act on the identified event, and if it is to act on the identified event it can take its action based on the timestamp included in the event message. In certain embodiments, the events that are to trigger an action and/or the specific responsive actions to be taken for a given event are dynamically programmable for each device. As described further herein, the event messages can be used to coordinate the operations of various devices with a high degree of temporal precision because the actions taken on each device can be based on the timestamp included in the event message.

For instance, according to at least one embodiment, a system comprises at least two devices that are communicatively coupled via a communication network, wherein the at least two devices include means for synchronizing their clocks. The means for synchronizing their clocks, according to various embodiments provided herein, synchronizes the local clocks of the devices by, for example, exchanging messages between the devices. Such synchronized clocks may be implemented according to the IEEE 1588 standard or the NTP standard, as examples. The at least two devices further comprise a means for communicating to the other of the at least two devices, via the communication network, a message that includes a timestamp and identifies an event. Further, the at least two devices comprise a means for receiving the message and determining a responsive action to take in response to the identified event, wherein a determined action is taken based on the timestamp included in the message. Thus, operations of the devices can be coordinated based on their local, synchronized clocks through the use of event messages communicated over the communication network.

In certain embodiments, the event messages are broadcast over the communication network using, for example, UDP. Thus, the sender of the event message need not be concerned with which other device(s) the message is to be sent, and may not even be aware of which other devices are coupled to the communication network. All devices on the communication network (e.g., a LAN or subnet of a WAN) can receive the broadcast event message, and each device can determine whether it is configured to take some action responsive to the identified event. If a recipient device is not configured to take an action for the identified event, it can ignore the broadcast event message. Of course, in other embodiments, the event messages may be sent in a non-broadcast fashion, such as by using TCP, for example.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE EMBODIMENTS

Figure 1:
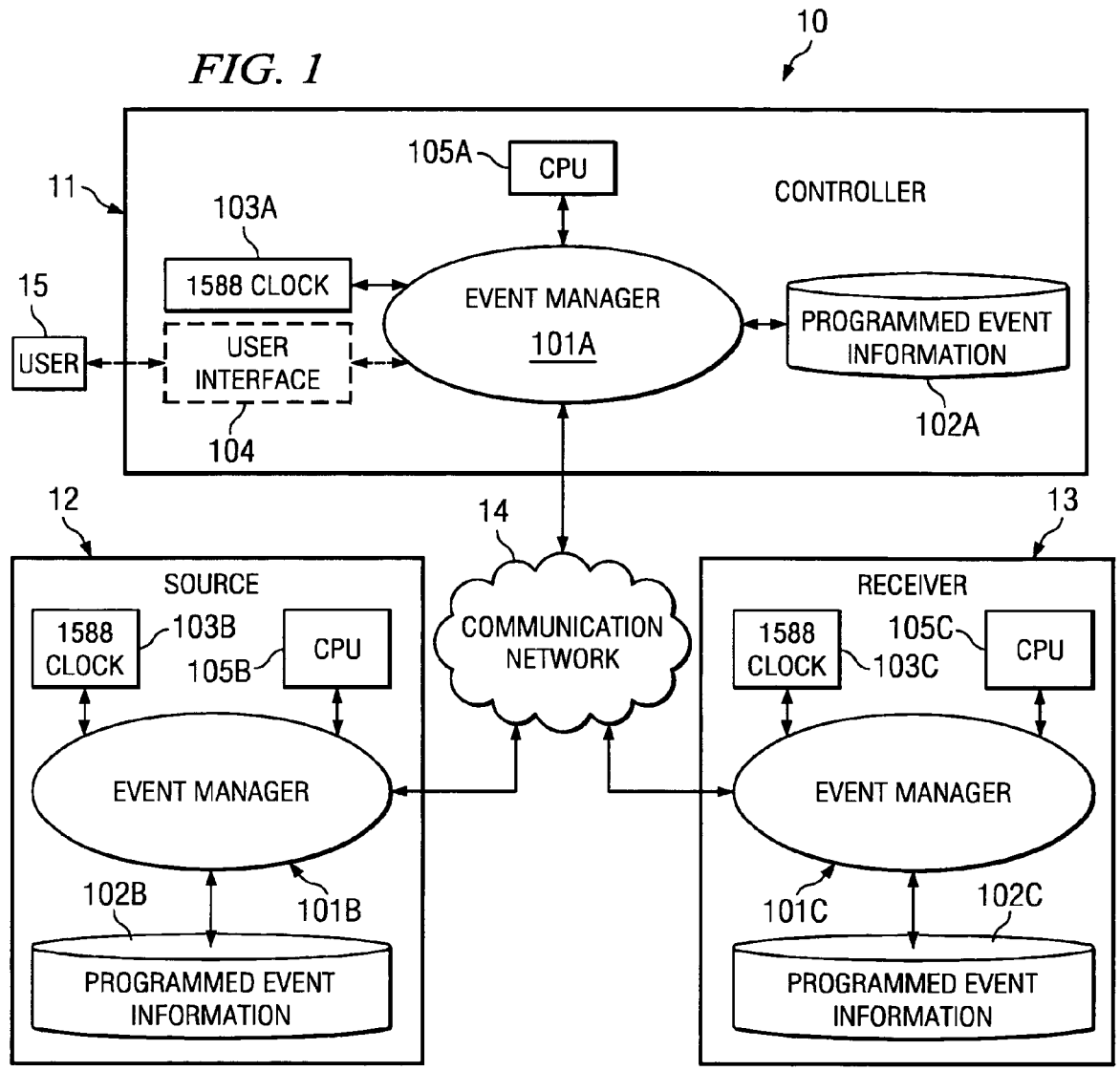
FIG. 1 shows an example system according to one embodiment for synchronizing operations of a plurality of networked devices.

As described above, measurement systems often require that the operation of several instruments be synchronized (or coordinated) in an appropriate manner to allow for accurate measurements to be obtained. For instance, a spectrum analyzer should be coordinated to make its measurements after a signal source has had sufficient opportunity to settle at its output frequency.

All or a portion of a measurement system may be formed with "synthetic instruments." Synthetic instruments are not able to complete measurements by themselves, but instead a collection of them must work together to implement a measurement. On the other hand, traditional all-in-one box instruments (referred to herein as "fully contained instruments") fully contain all sub-systems needed for making a desired measurement. For instance, a spectrum analyzer may be implemented as a fully contained instrument, or such spectrum analyzer may be formed by a collection of synthetic instruments, such as a receiver, digitizer, etc., that are communicatively coupled via a communication network. A fully contained system may need to interface with some other system in order to have something to measure. For instance, a fully contained spectrum analyzer interfaces with a source to measure the signal provided by the source. Whether using a plurality of fully contained instruments (e.g., spectrum analyzer, RF source, etc.), or a plurality of synthetic instruments (or a combination of fully contained and synthetic instruments), the relative operations of the various instruments is often desired to be coordinated in some manner to allow for accurate measurements.

Within the traditional fully contained instruments, various subsystems can accomplish timing and synchronization functions via hardware trigger lines and/or their underlying firmware. Synthetic instruments, which are functional pieces of the fully contained instruments, may need to be synchronized in some other way because, for example, such synthetic instruments may be arranged too far apart for use of hardware trigger lines to be practical and/or the wiring complexities involved with implementing such hardware trigger lines may render that solution undesirable. Additionally, the requirements for synchronization of synthetic instruments are often more stringent than for synchronization between separate fully contained instruments because of the fact that each synthetic instrument (or "module") contains a smaller set of functionality.

Referring again to the above-mentioned example of a spectrum analyzer, modern fully contained spectrum analyzers typically include a receiver and a digitizer. The spectrum analyzer's firmware controls the frequency sweep of the receiver as well as the digitizer, and it can easily synchronize the digitizer with the receiver frequency to ensure that measurements are taken correctly. A synthetic instrument system, on the other hand, might include a receiver and a digitizer, but not in the same instrument. Synchronization between these devices is therefore not contained within a single instrument. In this synthetic instrument system, synchronization of the digitizer with the receiver frequency is desired to ensure that the digitizer takes measurements at the time that the receiver frequency is settled, and not sooner or later than that. Techniques are provided herein that may be used for synchronizing the operations of a plurality of synthetic instruments and/or fully contained instruments.

Turning to FIG. 1, an example system 10 is shown according to one embodiment for synchronizing operations of a plurality of networked devices (or "instruments"). The example system 10 includes a controller 11, source 12, and receiver 13 that are all communicatively coupled via a communication network 14, which may be a local area network (LAN), the Internet or other wide area network (WAN), public switched telephony network (PSTN), wireless network, any combination of the foregoing and/or any other network now known or later developed for communicating information from at least one device to at least one other device. While a source 12 and a receiver 13 are shown in this example, it will be understood that embodiments for synchronizing operations described herein are not limited in application to these exemplary instruments. The techniques described herein may be employed for synchronizing the operations of any instruments that form a measurement system. Such techniques may be employed for synchronizing the operations of synthetic instruments of a measurement system and/or fully contained instruments. Further, while the techniques have particular applicability to measurement systems, in order to synchronize to a high-degree of precision the operations of various instruments that are used for making measurements, the techniques described herein may be likewise employed in other types of systems in which synchronization of operations of a plurality of networked devices is desired.

Controller 11, which may be a personal computer (PC) or other processor-based device, includes a central processing unit (CPU) 105A. Likewise, source 12 includes CPU 105B, and receiver 13 includes CPU 105C. Each of controller 11, source 12, and receiver 13 have their clocks synchronized in this example. In this specific example, IEEE 1588 is used, wherein controller 11 implements IEEE 1588 clock 103A, source 12 implements IEEE 1588 clock 103B, and receiver 13 implements IEEE 1588 clock 103C. Of course, other techniques for actively synchronizing the local clocks, such as using NTP, may be employed in other implementations. The local clocks are referred to as being "actively synchronized" because the devices interact with each other to maintain their respective local clocks synchronized in accordance with the particular synchronization technique employed (e.g., IEEE 1588 or NTP). Other techniques (e.g., passive techniques) may be employed in alternative embodiments for synchronizing the local clocks, using GPS (global positioning system) receivers, etc. Thus, the controller 11, source 12, and receiver 13 have their local clocks 103A, 103B, and 103C synchronized to a high-degree of precision such that they all have a common sense of time. As described further herein, in certain embodiments controller 11 need not have its local clock synchronized with the clocks of the other instruments in the measurement system, such as source 12 and receiver 13.

Controller 11, source 12, and receiver 13 each have an event manager executing thereon, labeled 101A, 101B, and 101C, respectively. In general, the event manager is software and/or hardware that is designed to allow the various instruments to communicate information about time-sensitive events. Operation of the event manager according to this example embodiment is described further below.

Before proceeding further with the discussion of the example system 10 of FIG. 1, it is helpful to briefly discuss some of the terminology that will be used herein.

The term "event", when used alone, refers to something that happens internally in an instrument, such as within source 12 or within receiver 13 of the example system 10. For example, an event could be generated when the input buffer of a digitizer fills up, or when an output signal has settled. Events are usually generated by the instrument's hardware, although that is not a restriction. Software can generate events also.

The term "event message" refers to a message sent on the communication network that is used to notify other instruments that an event has occurred. In certain embodiments provided herein, event messages are broadcast using, for example, User Datagram Protocol (UDP), to all of the instruments on a given communication network (e.g., on a given subnet). In other embodiments, the event messages are sent via a point-to-point protocol, such as Transmission Control Protocol (TCP). Any instrument can send an event message. Other instruments can either respond to event messages or ignore them.

The term "output event" refers to an event that results in an event message being communicated on the communication network. Note that not all events are output events. An instrument may handle some events internally.

The term "input event" refers to an event that is received from another instrument. The input event arrives in the form of an event message on the communication network.

The term "action" refers to something that an instrument does in response to either an event or an event message. In certain embodiments provided herein, actions are executed by means of callback routines. In this context, an action is not an atomic event, e.g., a callback routine can execute a complex sequence of instructions.

The term "programming message" refers to a message sent on the communication network that is used to program a recipient device to take a certain action responsive to detection of a certain event.

In accordance with the embodiments described herein, event messages are sent over the communication network 14 to coordinate the operations of the instruments, such as source 12 and receiver 13. Thus, rather than requiring hardware trigger lines between all of the instruments used in a measurement system, at least certain instruments are synchronized using the message-based technique described herein. According to at least one embodiment, the event messages include identification of an event, as well as a corresponding timestamp. The instruments can be configured/programmed to take particular action upon receiving a given event, which may be either an event received internally or an event included in an event message (an "input event"). As further described herein, in certain embodiments the actions are dynamically programmable. For instance, controller 11 may send a programming message to source 12 instructing its event manager 101B to take a particular action upon detection of a specific event. In certain embodiments, source 12 may be pre-configured to take the desired action responsive to a given event, rather than being dynamically programmed in this manner. Thus, since the instruments are programmed (or otherwise configured) to take appropriate actions responsive to detected events, event messages that identify events and corresponding timestamps (according to the instruments' synchronized local clocks) can be used for coordinating the respective operations of the instruments, as described further herein.

In the example embodiment of FIG. 1, controller 11, source 12, and receiver 13 each include programmed event information, labeled 102A, 102B, and 102C, respectively. Such programmed event information may, for example, specify the action(s) that the corresponding instrument is configured to take responsive to specified events. The programmed event information may, for example, be arranged as a database or stored in any other suitable manner. In certain embodiments, a user interface 104 is provided on controller 11 to enable a user 15 to interact with event manager 101A to, for example, program the event information on the various instruments. Examples of such programmed event information 102A-102C are described further herein, including the specific example provided in Table 2 below.

Because the local clocks of the instruments are synchronized to a high degree of precision, the actions of the various networked instruments can be coordinated with such high degree of precision. While a message-based approach can be used for coordinating the operations of the instruments, their operations can be coordinated with a higher degree of precision than is provided by the messages (e.g., due to latencies that may be encountered in sending the messages over the communication network 14, etc.) because the instruments have their local clocks synchronized to a high-degree of precision.

Suppose, for example, that source 12 is configured/programmed to change its output frequency (e.g. RF frequency) in response to detecting "Event No. 1", and once the frequency change has settled, then the source 12 is to output an event message identifying "Event No. 2". Further suppose that receiver 13 is configured/programmed to make a measurement of the signal (e.g., power and/or other characteristics of the signal) in response to detecting Event No. 2. User 15 may, in certain implementations, initiate the measurement process by interacting, via user interface 104, with controller 11 to cause an Event No. 1 to be sent to source 12. As described further herein, such Event No. 1 may, in certain implementations, be broadcast over communication network 14. Event manager 101B on source 12 would detect the Event No. 1 and, in accordance with the corresponding programmed action identified in the programmed event information 102B for this Event No. 1, would change its frequency and thereafter send an event message that identifies Event No. 2 to receiver 13. Again, in certain implementations, this event message sent by source 12 may be broadcast over communication network 14. The event message further includes a timestamp, based on the source's local clock 103B, corresponding to when the changed frequency settled (and is thus ready for measurement).

Receiver 13 receives the event message identifying the Event No. 2 and the corresponding timestamp, and thus receiver 13 can perform its programmed action responsive to the Event No. 2 based on the corresponding timestamp in the event message. For instance, receiver 13 may be programmed to take the measurement at the timestamp included in the received event message and send that measurement to the controller 11, responsive to detecting an Event No. 2. Even though the receiver 13 will receive the event message after the timestamp that was included in the event message in this example, if receiver 13 is continuously making measurements and buffering them, the receiver can retrieve from its buffer the measurement that corresponds to the timestamp included in the message and send that measurement to the controller 11. Thus, the controller 11 receives the measurement that corresponds to the exact timestamp included in the event message from the source 12 to the receiver 13. If the event message from the source 12 to the receiver 13 was delayed to such an extent that the receiver 13 no longer has in its buffer the measurement corresponding to the timestamp included in the event message, the receiver 13 may generate an error, for example.

As another example, the receiver 13 could be programmed to respond to detection of Event No. 2 by making a measurement at some period of time following the timestamp included in the received event message, such as at 2 seconds following the timestamp included in the received event message, and then send that measurement to the controller 11. Assuming that the event message can be generated and communicated across the communication network 14 within 2 seconds from the timestamp that is included in the message, the receiver can receive this message and make its measurement accordingly (or retrieve the corresponding measurement from its buffer if it is continuously making measurements). Thus, the receiver 13 can take its measurement at a time relative to the timestamp included in the event message, as opposed to the time that the receiver receives the event message. Accordingly, the operations of the source 12 and receiver 13 can be coordinated according to the timestamp included in the event message, and such timestamp is based on the synchronized clock of the sender of the message, i.e., the source in the above examples, rather than being limited to synchronizing operations based on the time at which messages are received (which may vary based on network latencies).

Figure 2:
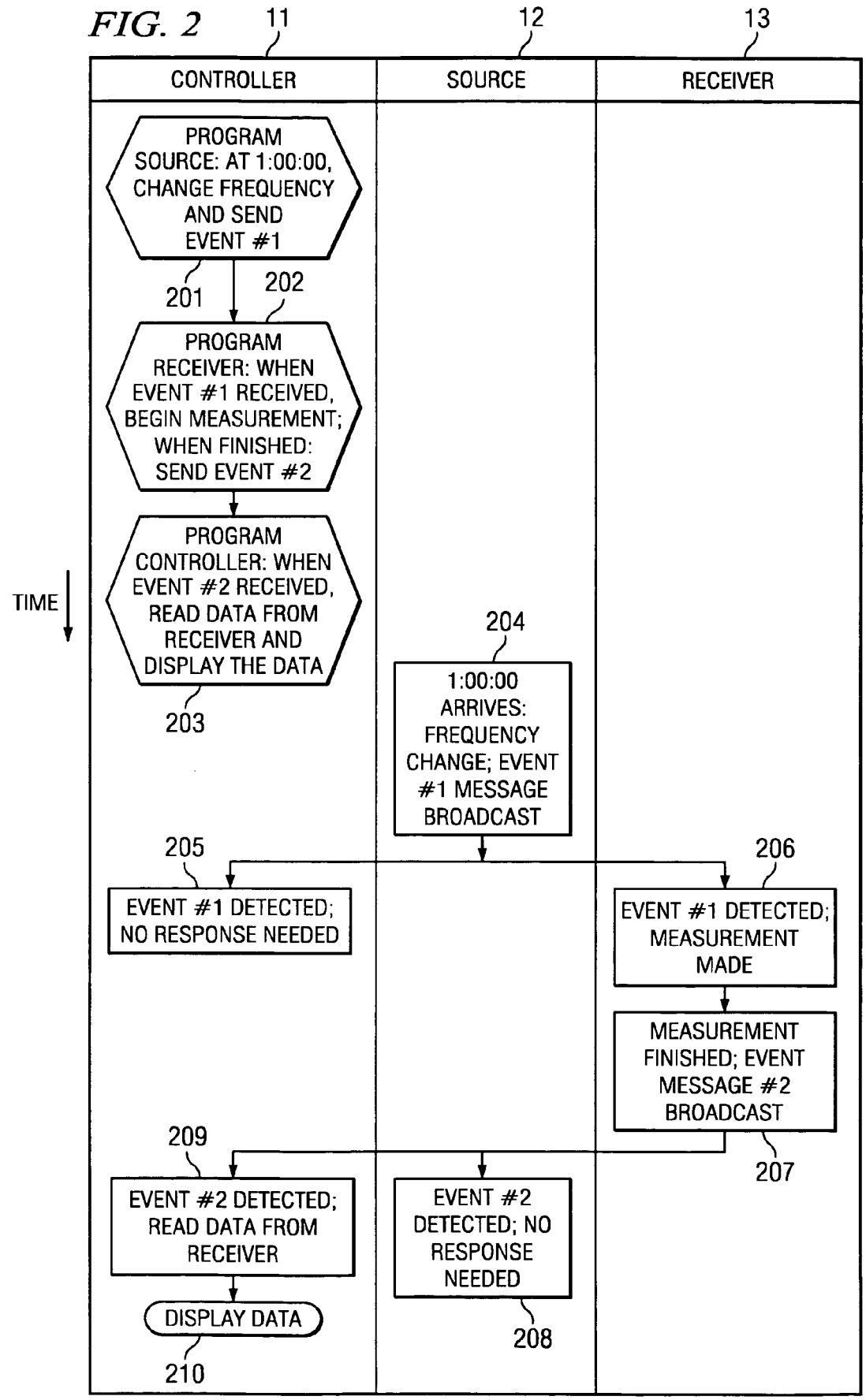
FIG. 2 a specific example of using a message-based technique in the system of FIG. 1 for coordinating the operations of the networked devices.

Turning to FIG. 2, a specific example of using a message-based technique in system 10 (of FIG. 1) for coordinating the operations of the networked instruments is shown. In the example of FIG. 2, controller 11 is used to program source 12 in operational block 201. For instance, user 15 may interact with user interface 104 to specify certain information according to which source 12 is to be programmed. In this example, source 12 is programmed to change its frequency at 1:00:00 and then broadcast an event message that identifies Event #1. Thus, this information is received (via a programming message) by source 12 from controller 11 and stored to its programmed event information 102B. Scheduling an event to occur at an absolute time or at some relative time (e.g., a time specified in relation to some other time, such as "10 seconds from the timestamp included in an event message that identified Event X") in this manner may be referred to as setting a "time bomb" that has an absolute or relative detonation time, wherein upon detonation of such time bomb the corresponding device for which the time bomb was set (source 12 in this example) takes some programmed action (changing its frequency in this example). An example of implementing such time bombs and using them for coordinating operations of networked devices is described further in concurrently filed and commonly assigned U.S. patent application Ser. No. 10/939,922 titled "SYSTEM AND METHOD FOR COORDINATING THE ACTIONS OF A PLURALITY OF DEVICES VIA SCHEDULING THE ACTIONS BASED ON SYNCHRONIZED LOCAL CLOCKS", the disclosure of which is incorporated here by reference.

Controller 11 is used to program receiver 13 in operational block 202. For instance, user 15 may interact with user interface 104 to specify certain information according to which receiver 13 is to be programmed. In this example, receiver 13 is programmed to make a measurement when Event #1 is detected and then broadcast an event message that identifies Event #2. Thus, this information is received by receiver 13 from controller 11 and stored to its programmed event information 102C.

Further, in this example, controller 11 itself is programmed, in block 203, to detect certain events and take responsive actions. For instance, user 15 may interact with user interface 104 to specify certain information according to which controller 11 is to be programmed. In this example, controller 11 is programmed to read measurement data from receiver 13 when Event #2 is detected and then display the read data. Thus, this information is received by controller 11 and stored to its programmed event information 102A.

At 1:00:00, the time bomb set on source 12 detonates, thus causing source 12 to change its frequency and then generate an event message that identities Event #1, which is shown as operational block 204 in FIG. 2. As mentioned above, the event message also includes a corresponding timestamp based on the local clock 103B of source 12. In this example, source 12 broadcasts the event message over the communication network 14, using UDP or some other suitable multicast protocol. Techniques that may be employed in certain embodiments for using an "unreliable" protocol, such as UDP, in a manner that increases its reliability, such as may be desired when the messages communicated in this manner are relied upon for coordinating operations between networked instruments, are described further in concurrently filed and commonly assigned U.S. patent application Ser. No. 10/939,921 titled "SYSTEM AND METHOD FOR ROBUST COMMUNICATION VIA A NON-RELIABLE PROTOCOL", the disclosure of which is incorporated herein by reference.

Thus, event manager 101B of source 12 broadcasts an event message that identifies Event #1 and that includes a corresponding timestamp based on the local clock 103B of source 12. For instance, the timestamp may be time 1:00:01, which corresponds to the time at which the changed frequency settled. It should be understood that source 12 could be programmed to send the message at the time that it begins changing its frequency and the timestamp included in the event message may therefore correspond to the time that the source begins the frequency change, in which case the receiver 13 may be programmed to take its measurement at some delayed time relative to the included timestamp to allow for the frequency to settle. In this manner, the event message can be en route to the receiver while the frequency change is occurring on the source, which may lead to improved efficiency in the measurement.

The broadcast Event #1 is detected by the event manager 101A of controller 11, and in operational block 205, such event manager 101A of controller 11 determines that no responsive action is needed by controller 11. That is, controller 11 has not been programmed to take any responsive action to a received Event #1, and thus event manager 101A ignores the event message that was broadcast by source 12.

Similarly, the broadcast Event #1 is detected by the event manager 101C of receiver 13. Because receiver 13 is programmed (see operational block 202) to make a measurement upon receiving Event #1, in operational block 206, event manager 101C of receiver 13 causes such responsive action to be taken by receiver 13. As discussed above, receiver 13 may be programmed to make its measurement at the timestamp included in the event message (wherein the receiver 13 may retrieve a buffered measurement that it made at such timestamp), or receiver 13 may be programmed to make its measurement at a programmed time interval from the timestamp included in the event message, as examples.

Just as receiver 13 was programmed to do in block 202, in operational block 207, receiver 13 broadcasts an event message that identifies Event #2 and that includes a corresponding timestamp based on its local clock 103C. The broadcast Event #2 is detected by the event manager 101B of source 12, and in operational block 208, such event manager 101B of source 12 determines that no responsive action is needed by source 12. That is, source 12 has not been programmed to take any responsive action to a received Event #2, and thus event manager 101B ignores the event message broadcast by receiver 13.

The broadcast Event #2 message is also detected by the event manager 101A of controller 11. Because controller 11 is programmed (see operational block 203) to read the measurement data from receiver 13 and display such data upon receiving Event #2, in operational block 209, event manager 101A of controller 11 causes such responsive action to be taken by controller 11. Thus, controller 11 reads the measurement data from receiver 13. For instance, the measurement data captured by receiver 13 in accordance with the timestamp of the event message that receiver 13 received from source 12 may be stored to a certain memory address in receiver 13, and the controller 11 may read that certain memory address of the receiver in block 209. As another example, the event message generated by receiver 13 may include a timestamp at which its measurement was made (e.g., either the same timestamp included in the event message that was sent from source 12 to receiver 13, or a timestamp that is a certain interval from the timestamp included in the event message that was sent from source 12 to receiver 13), and controller 11 may query receiver 13 for its measurement corresponding to the timestamp at which such measurement was made in block 209. Then, in block 210, controller 11 displays the read measurement data.

In the above example, controller 11 will not receive the event message that identifies Event #2 until some time after the measurement is made by receiver 13, and controller 11 will not read and display such measurement data until an even later time. However, because of the use of the timestamps of the synchronized clocks in the event messages, controller 11 can be assured that it is displaying the appropriate measurement data. For instance, if the receiver 13 made its measurement at 1:00:01, controller 11 can be assured that it is displaying the measurement data that was captured at 1:00:01, event though controller 11 may not receive and display the measurement data until 1:00:05, for example.

Of course, application of the embodiments provided herein for synchronizing the operations of devices is not limited to the specific example of FIG. 2.

As the above example illustrates, the event manager 101A-101C (FIG. 1) is built upon IEEE 1588 functionality for synchronized clocks but it also goes beyond IEEE 1588 by allowing arbitrary asynchronous events to be generated and broadcast to other instruments. In certain embodiments, each instrument in a system may be able to broadcast an event message on the network whenever an event happens. The list of events that are actionable on each instrument can vary from instrument to instrument, and in some embodiments the actions are programmable on each instrument. For example, a source might be programmed to broadcast an event message whenever the output signal has settled after a frequency change, such as in operational block 204 in the above example of FIG. 2, or a digitizer might send an event message whenever its input buffer is full. The set of actionable events can thus be defined specifically for to each instrument.

In order to receive event messages in certain embodiments, any instrument will be able to "subscribe" to event messages. That is, each instrument should be able to listen to event messages that are broadcast by other instruments (via their respective event manager) and respond to them appropriately (or to ignore them).

Suppose, for example, that a measurement is being made that requires an upconverter to change frequency. The upconverter must settle before the digitizer can read any data. The upconverter has a built-in ability to generate an internal event (probably an interrupt) whenever the output signal settles. Using an event manager implemented for such upconverter and digitizer, this could be accomplished via the following sequence:

1. The user sends a command from a controller PC to the upconverter that programs the upconverter to respond to the "signal settled" event, which is an internal event that has been pre-defined in the upconverter. As part of configuring this event, the user specifies a callback routine. This routine is called whenever the "signal settled" event occurs, and it is responsible for broadcasting an event message to other instruments on the network.

2. The user programs the digitizer to respond to the "signal settled" event message from the upconverter. Again, a callback routine is specified. In this case the callback routine is responsible for starting a measurement in the digitizer.

3. The user sends a command to the upconverter to change frequency.

4. When the upconverter's output signal has settled, an internal event is generated and the upconverter's callback routine is called. This results in an event message being broadcast on the network. The message includes an event identifier (e.g., "signal settled on upconverter #1") and a timestamp.

5. The message is received by the digitizer and parsed to determine whether or not the message is relevant. Since the digitizer has been programmed to respond to this message, the callback routine is executed and a measurement is begun.

It is important to note that event messages are timestamped using the IEEE 1588 clock. This allows the receiving instrument to adjust its response, if appropriate. In the case of a digitizer with a circular measurement buffer, for example, it allows data to be saved at the exact time of the original event (or even earlier), even if network latencies delay the arrival of the event message.

It should be recognized that the operation of various networked instruments can be coordinated based on events that occur in the devices by generating messages that identify an event and includes a timestamp. Of course, as the example of FIG. 2 illustrates, the event-based approach may be combined with a time-based approach (e.g., that uses time bombs for scheduling events to occur at scheduled times, either absolute or relative times). For instance, in addition to instrument-specific events, instruments may be implemented to support "time bombs". This allows the user to define the time at which an event will happen (using the IEEE 1588 clock, which is synchronized with the clocks on every other instrument in the system). At that time, a user-definable event message may be sent to other instruments on the network, or some other internal function may be executed, or both.

As a further example, the above-mentioned synthetic system of a networked upconverter and digitizer may have their operations coordinated using a combination of a time-based model and an event-based model, as follows:

1. The host computer defines an event message that is used to start a measurement. This new event message is called the "start" message.

2. The upconverter is programmed to switch to a new frequency whenever it receives a "start" event message. More precisely, the "start" message may contain a time stamp, and the upconverter will be programmed to switch to a new frequency at some time after that. This accounts for network latencies and ensures that the upconverter and digitizer are working from the same time base.

3. It is known that the upconverter's output signal will settle after 100 microseconds (μsec). The digitizer is programmed to begin making a measurement 100 μsec after it receives a "start" event message. More precisely, the digitizer can use the time stamp from the "start" message to make a measurement 100 μsec after the upconverter switches.

4. The host computer broadcasts a "start" event message.

A specific implementation of an event manager is described in further detail below, but embodiments are not intended to be limited to this specific implementation.

In this illustrative implementation, the event manager is in many ways analogous to a network service daemon like an FTP server or a Web server—it waits for inputs and then acts on them. In such implementation, the event manager is a listen-only network server when handling inputs, but its implementation differs for output events. This illustrative implementation of the event manager may be thought of as a collection of threads, although it should not be assumed that the event manager will actually be implemented using a threaded model (this depends on the operating system). The illustrative implementation can be modeled as a collection of threads that are all waiting for some type of input. Each thread goes to sleep until its input buffer has data available.

Input events arrive on the communication network. The event manager simply waits for event messages to arrive, in exactly the fashion that any other network server would. When an event message arrives, the event manager wakes up and examines the data packet. If the data packet contains an Event ID (described further below) that the instrument has been programmed to respond to, the event manager calls the corresponding callback routine.

Output events are generated internally. Often, output events (e.g. time bombs) are the result of hardware interrupts. In this case an interrupt service routine (ISR) is installed for use on the instrument. The ISR will be responsible for capturing a time stamp for the event, storing the data, and waking up the event manager, which then executes the appropriate callback routine. The ISR is not the same as the callback routine.

Other events may be handled differently, depending on the hardware/software architecture of the instrument. The event manager allows an arbitrary callback routine to be executed at the time of an event, and that callback routine may handle the event internally.

In this example implementation, the event manager relies on multi-cast messages. Multi-casting is usually implemented via the UDP protocol, which is not designed to be a high-reliability service. Packets can (and do) get lost. It is desirable for the event manager to have the ability to detect lost packets; but since event messages are time-critical in most measurement instruments, it is often equally desirable to avoid the overhead that is inherent in hand-shaking protocols like TCP.

The event manager's reliability can be improved through use of one or more of the following techniques:

1. Careful choice of switches. Switches should be chosen that include a high level of store-and-forward capability to minimize packet loss, and that implement QoS functionality so that UDP packets can be given high priority.

2. Redundant broadcast of event messages. Event messages can be broadcast multiple times to ensure that they are received; the receiving modules can be configured to ignore multiple receptions of the same message. Example techniques that use redundant broadcast of UDP packets for improving reliability are described further in concurrently filed and commonly assigned U.S. patent application Ser. No. 10/939,921 titled "SYSTEM AND METHOD FOR ROBUST COMMUNICATION VIA A NON-RELIABLE PROTOCOL", the disclosure of which is incorporated here by reference.

3. A user-specified timeout for event messages. When an instrument "subscribes" to an event, a maximum time delay for that event is specified. When an event message arrives, the time stamp that is contained in the event message is compared with the current time. If the difference is greater than the given maximum, then an error condition occurs. Errors can be broadcast on the communication network or sent to the controlling computer via a TCP connection, as examples.

There are several data types that are used in this illustrative example of an event manager. A first data type is Time. The event manager has two different time-based data types. One for absolute time (TimeStamp), and another for time intervals (TimeInterval).

Another data type is Function ID ("FID"). The FID is a value (e.g., a 16-bit integer) that represents some internal functionality of an instrument. It may be implemented as an instrument-specific number that is used to identify various functions that are intrinsic to the instrument.

Instrument functions are classified as "inputs" or "outputs". In this nomenclature, an "output" function is something that happens internally on the instrument and thereby causes an event message to be sent to other instruments. An "input" function is one that the instrument can execute in response to an event message from elsewhere. A time bomb is a special version of an output function for which specific API operations exist (e.g., to set the detonation time). These functions correspond closely to the definitions of "input events" and "output events". Strictly speaking, an "input event" is an event that would result in the execution of an "input function".

In this example implementation, every instrument has a table of FID values and their descriptions, as in the example provided in table 1 below:

TABLE 1

| | Description |
|---|---|
| Output FID Values | |
| 001 | Source settled |
| 002 | Event 1 out |
| 003 | Event 2 out |
| 004 | Trigger out |
| 005 | Time bomb 1 |
| 006 | Time bomb 2 |
| 007 | Time bomb 3 |
| Input FID Values | |
| 0080 | Step Frequency by 1 MHz |
| 009 | Patt Trig In |

It should be noted that some of these functions can also have a corresponding hardware trigger (either a trigger input or a trigger output).

A user can programmatically extend the Function ID table for a given instrument. When an instrument needs to be programmed to respond to an external event, for example, a new internal function can be added to the table.

Another data type is Event ID ("EID"). The EID is a user-defined value (e.g., a 16-bit integer) that is included in a broadcast event message to identify an event. On input of an event message, and instrument will read the EID to determine if it should respond to it or not (e.g., to determine whether the identified event is one which the instrument has been configured/programmed to take some responsive action). On output, the instrument will add the EID to the event message packet so that other instruments can identify the source of the event.

In general, this allows the user to define EID values that are used with FID values. For instance, an instrument may experience a "time bomb" event, and the FID for that event is "3" (and is hard-coded into the instrument). But if an event message is broadcast as a result of this event, the EID value is user-definable, and does not have to be the same as the FID.

Each individual instrument may pre-define default EIDs for most of the FIDs. But the system integrator/end user can set/change the EID values for any of the FIDs as may be desired.

The user may, for example, specify EIDs that are unique to each instrument in a test system. Otherwise, problems may be encountered whenever a test system includes multiple identical instruments. For a given test system, the user may also specify unique EIDs for each instrument's events.

A Function ID to Event ID map is provided in this example implementation.

That is, the event manager subsystem in each instrument maintains a FID to EID map. This may be implemented as a table, for example. This table maintains the mapping between EIDs and FIDs, and also includes other data, such as:

(a) A flag for disabling/enabling each function.

(b) The (address of) the callback function that is used for the event.

(c) Information as to whether or not the event in question is an input or an output. While time bombs are output events, they may be flagged specially in the table because they have specific API functions associated with them.

(d) A timeout value. This is used for input events and represents the maximum delay that can be tolerated before an event message is received.

An example of such a table for an instrument is provided in Table 2 below.

TABLE 2

| Function ID | Description | Event ID | Enable/ Disable | Input/Output/ Time Bomb | Callback function | Timeout |
|---|---|---|---|---|---|---|
| 001 | Source settled | 23012 | Y | Output | xxx | N/A |
| 002 | Event 1 out | 23013 | Y | Output | yyy | N/A |
| 003 | Event 2 out | 23014 | N | Output | zzz | N/A |

TABLE 2-continued

| Function ID | Description | Event ID | Enable/ Disable | Input/Output/ Time Bomb | Callback function | Timeout |
|---|---|---|---|---|---|---|
| 004 | Time Bomb | 23015 | N | Time Bomb | ... | N/A |
| 101 | Trigger In | 55013 | Y | Input | ... | 123.456 |
| 101 | Alt. Trigger | 55014 | Y | Input | ... | 12.3456 |
| 102 | Dump data | 66013 | N | Input | ... | 1.23456 |
| 103 | Shutdown | 66014 | N | Input | ... | 12.3456 |
| 104 | Use programmed | 66015 | N | Input | ... | 123.456 |

A given FID in the table represents either an input or an output, but not both. A time bomb is a special type of output function. Table 2 provides an example of information that may be stored to the programmed event information 102B of source 12. The programmed event information 102A and 102C of controller 11 and receiver 13 may be arranged similarly.

The enable/disable setting of Table 2 reduces unnecessary traffic over the communication network for output events, and is used to identify relevant event messages for input events. By default the individual instrument may set the state of the enable/disable flag for all functions (most will be disabled) and set default EIDs for each function. It is possible to specify (and enable) multiple EIDs for a given FID. This enables the event manager to execute the same function if any of the EIDs is received.

Another data type is Event Message Data. According to this illustrative implementation, event messages are of a simple data format and include the following information:
1. Event ID
2. Time stamp
3. Number of bytes to follow
4. Event-specific data Event messages are sent using the SendEvent( ) call. Usually, this routine is called from within user callback routines. The data that is sent with the event is preferably minimal to avoid/minimize network latency issues.

Various API functions are provided in this illustrative implementation. One API function is Reset( ). This function resets the event manager to its default (factory) state. All functions will be disabled. Pending time bombs and event messages will be cancelled. User-defined events will be deleted.

Another API function is GetCurrentTime( ). This function returns the current value of the IEEE 1588 clock.

Another API function is CreateInputFn (FID). This function creates a new input function with the given FID. The function is created with no EIDs or callbacks, and it is marked as an input function (not an output function or a time bomb). It returns an error and does nothing if the given FID is already in use, or if there is not enough memory to expand the function table.

Another API function is DestroyInputfn (FID). This function removes the given function from the function table. It returns an error and does nothing if the given FID does not exist.

Another API function that is provided is SetCallBackFn (FID, CallBackFn, CancelCallBackFn, ErrorCallBackFn, PtrToVendorData). This function sets the callback function for any FID value. The 'CallBackFn' is called when an event occurs. For output events, the callback function will usually format an event message and broadcast it on the communication network, although the event manager does not restrict the functionality of the callback. For input events, the callback function will be called when an event message is received that maps to the given function.

The 'CancelCallBackFn' is called whenever the function is disabled. If the function is already disabled, this callback will not be executed. The 'Error CallBackFn' is called for any warning or errors. For example if a time adjustment happens, that may force some time bombs to be ignored and will raise a warning/error. The types of errors that will cause this routine to be called will generally be instrument-specific. The SetCallBackFN does nothing and returns an error if a user tries to assign callbacks to an FID that does not exist.

In this example implementation, callback functions are passed the following parameters:
Function ID
Event ID
Time Stamp
Vendor-specific Data To avoid any unnecessary function calls, any of the callback functions can be null.

Another API function that is provided is SetTimeout(FID, MaxYTimeDelay). This function sets the maximum time delay that can be tolerated before an event message is received. If a received event was delayed by more than MaxTimeDelay, then an error condition will occur. This function does nothing and returns an error if the given function is not an input function.

MapFIDtoEID(FID, EID) is another API function that is provided. This function maps a given FID to an EID. This function does nothing and returns an error if a user tried to map from an FID that does not exist.

UnMapFIDtoEID(FID, EID) is an API function that unmaps a given FID from an EID. This returns the mapping to the default state and also disables the event (see EnableEvent below). This functionality is similar to the EnableEvent call (below), but it is used in cases where multiple EIDs are mapped into a single FID and only one of the EIDs is to be unmapped. This function does nothing and returns an error if the given FID/EID pair cannot be found.

EnableEvent(FID, EID, true/false) is an API function that enables or disables an event using FID or EID or both. If the function is an input, it subscribes/unsubscribes to all occurrences of it; and if the function is an output, it enables/disables all occurrences of the output. If a zero is specified for either FID or EID, the parameter will be ignored and the other (presumably non-zero) parameter will be used.

If the given FID refers to a time bomb, the function is to be enabled by this function and initialized by a CreateTimeBomb( ) function (see below). This function EnableEvent can be used to disable a time bomb, in which case it does the same thing as the CancelTimeBomb( ) call. This EnableEvent function does nothing and returns an error if the FID/EID pair cannot be found.

SendEvent(EID, TimeStamp, Data, Bytes) is another API function that is provided. This function broadcasts an event message. It is intended to be called from within callback routines, and shouldn't be called if the function is disabled, although this will not cause an error.

CreateTimeBomb(FID, TimeStamp, RepeatCount, TimeInterval) is another API function that is provided. This function will set a repeated time bomb that will start from the given time stamp, then it will repeat for RepeatCount−1 times using the given time interval (so the total number of detonations is RepeatCount). The RepeatCount can be set to −1 for infinite looping. Every time the time bomb expires the CallBackFn is called for execution.

CreateTimeBomb(FID, TimeStamp, Frequency) is another function, which is a special version of the above function. This function creates a repeated time bomb with repeat_count=−1. The time interval is calculated from the frequency parameter.

Another API function provided is CancelTimeBomb(FID). This function will try to cancel a time bomb. There is no guarantee that the time bomb will be cancelled before it fires. In some cases the CallbackFn may handle this with internal flags. This CancelTimeBomb function does the same thing as EnableEvent( ) when EnableEvent( ) is used to disable a time bomb function. The CancelTimeBomb function returns an error and does nothing if the given FID does not have any time bombs set, or if the FID is not a time bomb to begin with.

GetFunctionMap( ) is a function that will return the information that is contained in the FID-to-EID map (defined above). This function may be used for debugging purposes, for example.

The event manager includes a network daemon that listens for commands on the communication network and makes appropriate API calls on the instrument's local processor. This functionality enables a (remote) host computer to program an instrument for measurement-specific tasks. The controlling computer may, for instance, program an instrument to start a measurement when a certain event message is received. To do that, it sends a programming command to the instrument.

As described above, the event manager also listens for broadcast event messages from other instruments. This means that the event manager of this example implementation includes two network listeners: one to listen for event messages from other instruments (which listens on a multicast UDP port), and one to listen for remote programming commands (which listens on a TCP port).

The network daemon simply listens on a TCP port for commands. Each command may be accompanied by additional data. Note that the allowed commands correspond to the API functions that are described above.

While an illustrative implementation of an event manager is described in detail above, embodiments are not limited to that example implementation. Rather, various features and implementation details provided above may be changed in alternative embodiments. For example, in certain embodiments TCP may be used for sending event messages, rather than broadcasting event messages via UDP. Also, the various example API functions provided in the example event manager described above may change, all or some of such functions may not be provided, and/or additional functions may be provided in alternative event manager implementations.

Figure 3:
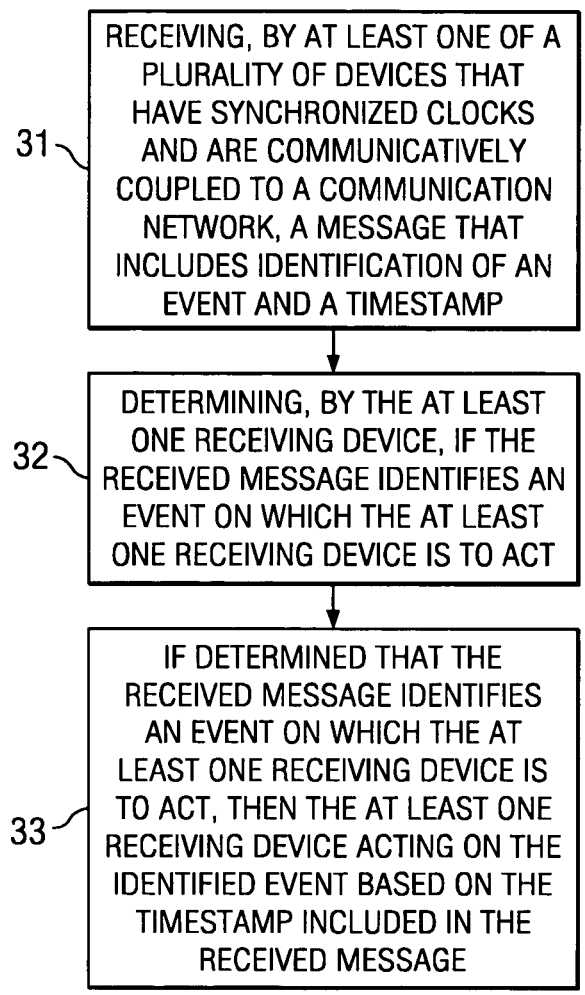
FIG. 3 shows an operational flow diagram for synchronizing the operation of a plurality of networked devices according to one embodiment.

Turning to FIG. 3, an operational flow diagram for synchronizing the operation of a plurality of networked devices according to one embodiment is shown. In operational block 31, an event message that includes identification of an event and a timestamp is received by at least one of the plurality of networked devices, wherein the devices have synchronized clocks. As described above, in certain embodiments the event message is broadcast from a sending device to all other devices on the communication network. In block 32, the at least one device that received the event message determines if the received event message identifies an event on which the at least one receiving device is to act. As described above, in certain embodiments the devices may be dynamically programmed as to the events to which they take a responsive action, as well as to the specific responsive actions that the device is to take for a given event. In block 33, if determined that the received message identifies an event on which the at least one receiving device is to act, then the at least one receiving device acts on the identified event based on the timestamp included in the received message. Thus, the action of the receiving device can be coordinated with the sending device based on their synchronized clocks.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system comprising:
at least two devices that are communicatively coupled via a communication network, wherein the at least two devices include means for synchronizing their clocks;
the at least two devices comprise a means for communicating to the other of the at least two devices, via the communication network, a message that includes a timestamp and identifies an event, the message being sent over the communication network to coordinate the operations of the at least two devices, wherein the identified event occurs internally to one of the at least two devices, and said means for communicating said message to the other of the at least two devices comprises means for broadcasting said message via said communication network; and
the at least two devices comprise a means for receiving the message and determining a responsive action to take in response to the identified event, wherein a determined action is taken based on the timestamp included in the message.

2. The system of claim 1 wherein the means for synchronizing their clocks comprises: means for implementing IEEE 1588 standard for synchronizing said clocks.

3. The system of claim 1 wherein the means for synchronizing their clocks comprises: means for implementing Network Time Protocol (NTP) for synchronizing said clocks.

4. The system of claim 1 wherein said means for synchronizing their clocks comprises: means for actively synchronizing said clocks by said at least two devices interacting with each other.

5. The system of claim 1 wherein said timestamp is based on the clock of the device sending the message.

6. The system of claim 1 wherein said means for broadcasting sends said message via User Datagram Protocol (UDP).

7. The system of claim 1 wherein said means for receiving the message comprises: means for receiving a broadcast message over said communication network.

8. The system of claim 1 wherein if said means for determining a responsive action determines that no action is to be taken for said identified event, then said other device takes no responsive action.

9. The system of claim 1 wherein the other device is programmable as to the responsive action to take in response to the identified event.

10. The system of claim 1 wherein the at least two devices are instruments in a measurement system.

11. The system of claim 10 wherein the at least two devices are synthetic instruments.

12. The system of claim 1 wherein the other device takes the determined responsive action at the timestamp included in the received message.

13. The system of claim 1 wherein the other device takes the determined responsive action at a defined time relative to the timestamp in the received message.

14. A system comprising:
at least two devices that are communicatively coupled via a communication network, wherein the at least two devices have synchronized clocks;
the at least two devices each comprise an event manager that is operable to receive messages from the other of the at least two devices, the messages being sent over the communication network to coordinate the operations of the at least two devices wherein the messages include information identifying an event and a timestamp, and the event occurs internally to one of the at least two devices; and
the event manager is operable to determine whether to trigger an action by its corresponding device responsive to an identified event in a received message, wherein if an action is determined to be triggered, such action is triggered based on the timestamp included in the received message.

15. The system of claim 14 wherein the at least two devices actively synchronize their clocks by interacting with each other.

16. The system of claim 14 wherein the at least two devices synchronize their clocks according to the IEEE 1588 standard.

17. The system of claim 14 wherein said timestamp is based on the clock of the device sending the message.

18. The system of claim 14 wherein the event manager operable to receive said messages broadcast over the communication network.

19. The system of claim 14 wherein the event manager is operable to broadcast a message over said communication network.

20. The system of claim 14 wherein at least one of the devices is programmable as to the action to trigger in response to the identified event.

21. The system of claim 14 wherein the action is triggered at the timestamp included in the received message.

22. The system of claim 14 wherein the action is triggered at a defined time relative to the timestamp in the received message.

23. The system of claim 14 wherein the at least two devices are instruments in a measurement system.

24. A system comprising:
a plurality of devices that are communicatively coupled via a communication network, wherein the at least two devices have synchronized clocks;
at least one of the plurality of devices comprising an interface for receiving input that programs the at least one device to take a defined action responsive to a specified event; the at least one of the plurality of devices further comprising an event manager operable to receive messages from the others of the plurality of devices, wherein the messages include information identifying an event and a timestamp the messages being sent over the communication network to coordinate the operations of the at least two devices, and the event occurs internally to one of the plurality of devices; and
wherein the event manager is operable to determine whether an event identified by a received message is an event for which the at least one of the plurality of devices is programmed to take a corresponding defined action, and if the event identified by a received message is an event for which the at least one of the plurality of devices is programmed to take a corresponding defined action, the event manager triggers the at least one of the plurality of devices to take the corresponding defined action based on the timestamp of the received message.

25. The system of claim 24 wherein the at least one of the plurality of devices takes the corresponding defined action at a programmed time after the timestamp of the received message.

26. The system of claim 24 wherein the event manager is operable to receive said messages broadcast over the communication network.

27. A method comprising:
receiving, by at least one of a plurality of devices that are communicatively coupled to a communication network, a message that includes identification of an event and a timestamp, wherein the message is used to coordinate the operations of the plurality of devices;
determining, by the at least one receiving device, if the received message identifies an event on which the at least one receiving device is to act, wherein the event occurs internally to one of the plurality of devices;
if determined that the received message identifies said event on which the at least one receiving device is to act, then said at least one receiving device acting on the identified event based on the timestamp included in the received message.

28. The method of claim 27 wherein said at least one receiving device acting on the identified event at a defined time after said timestamp.

29. The method of claim 27 further comprising: said at least one receiving device receiving a programming message that configures the receiving device to take an action responsive to an event.

30. The method of claim 27 wherein said receiving said message comprises: receiving said message broadcast over the communication network.

31. A method comprising:
sending, via a communication network, a message from a first device to at least one other device, wherein the message identifies an event and includes a timestamp, the message being sent over the communication network to coordinate the operations of the first and at least one other device, wherein the event occurs internally to the first device; receiving the message, by the at least one other device;

determining, by the at least one other device, if the event identified in the received message is actionable; and if determined by the at least one other device that the identified event is actionable, said at least one other device taking action responsive to the identified event based on the timestamp included in the message.

32. The method of claim 31 wherein said action taken by the at least one other device is synchronized in a desired manner with an action taken by the first device.

33. The method of claim 31 wherein said sending comprises broadcasting.

34. The method of claim 31 wherein said at least one other device taking action responsive to the identified event comprises: taking a measurement.

35. The method of claim 31 wherein said at least one other device taking action responsive to the identified event based on the timestamp comprises: taking said action at a defined time relative to the timestamp.

36. The method of claim 31 wherein said timestamp is based on a local clock of the first device, and wherein local clocks of the first device and said at least one other device are actively synchronized.

37. A method comprising:

programming a device to define an action for the device to take responsive to a specified event; receiving, by the device, messages via a communication network from at least one other device with which the device is temporally synchronized, the messages being sent over the communication network to coordinate the operations of the device and the at least one other device, wherein the messages each identify an event and include a timestamp, and each event occurs internally to the device;

determining, by the device, whether an event identified by a received message is the specified event; and if the event identified by a received message is the specified event, then the device taking the defined action based on the timestamp of the received message.

38. The method of claim 37 wherein the defined action is taking a measurement.

39. The method of claim 37 wherein local clocks of the device and the at least one other device are actively synchronized.

40. The method of claim 39 wherein the local clocks are synchronized via one selected from the group consisting of: IEEE 1588 and Network Timing Protocol (NTP).

41. The method of claim 37 wherein the device taking the defined action based on the timestamp comprises: taking said defined action at a programmed time relative to the timestamp.

* * * * *